United States Patent
Lin et al.

(10) Patent No.: US 8,014,414 B2
(45) Date of Patent: Sep. 6, 2011

(54) METHOD AND SYSTEM FOR GENERATING A PACKET IDENTIFIER TABLE FROM A RECEIVED TRANSPORT STREAM

(75) Inventors: Chi-Chia Lin, Tainan County (TW); Wen Jen Huang, Tainan County (TW); Shu-Ming Liu, Tainan County (TW)

(73) Assignee: Himax Media Solutions, Inc., Tainan (TW)

( * ) Notice: Subject to any disclaimer, the term of this patent is extended or adjusted under 35 U.S.C. 154(b) by 162 days.

(21) Appl. No.: 12/195,416

(22) Filed: Aug. 21, 2008

(65) Prior Publication Data

US 2010/0046541 A1    Feb. 25, 2010

(51) Int. Cl.
*H04L 12/54*     (2006.01)
*H04N 7/173*     (2011.01)

(52) U.S. Cl. ............. 370/429; 725/93; 725/96; 725/116

(58) Field of Classification Search .................. None
See application file for complete search history.

(56) References Cited

U.S. PATENT DOCUMENTS

| | | | |
|---|---|---|---|
| 7,113,523 B1* | 9/2006 | Kubota et al. | 370/535 |
| 7,366,961 B1* | 4/2008 | Kovacevic et al. | 714/701 |
| 2002/0057699 A1* | 5/2002 | Roberts | 370/395.32 |
| 2008/0165774 A1* | 7/2008 | Huang et al. | 370/392 |

* cited by examiner

*Primary Examiner* — Kwang B Yao
*Assistant Examiner* — Jutai Kao
(74) *Attorney, Agent, or Firm* — Su IP Consulting

(57) ABSTRACT

One embodiment of the present invention sets forth a method of generating a packet identifier table that comprises reading a packet identifier value from a received transport stream packet, identifying a type of data contained in the received transport stream packet, and generating a table with mapping information between the packet identifier value and the identified type of data.

20 Claims, 5 Drawing Sheets

Packet Identifier Table 302

| PID Value | Data Type |
|---|---|
| 0x17 | PSI section |
| 0x2E | PSI section |
| 0x33 | Audio |
| 0x34 | Video |

__METHOD AND SYSTEM FOR GENERATING A PACKET IDENTIFIER TABLE FROM A RECEIVED TRANSPORT STREAM__

BACKGROUND OF THE INVENTION

1. Field of the Invention

The present invention generally relates to digital television technologies, and more particularly to a method and system for generating a packet identifier table from a received transport stream.

2. Description of the Related Art

Unless otherwise indicated herein, the approaches described in this section are not prior art to the claims in this application and are not admitted to be prior art by inclusion in this section.

Compared to an analog television, a digital television ("DTV") is capable of broadcasting a higher number of programs with higher-quality video and audio content. A broadcaster source usually compresses and multiplexes the video and audio contents of an original program with other programs and system information that is needed to recover the original programs. The multiplexed signal is then modulated and transmitted in the form of transport stream packets to a subscriber's home. A receiver device at the subscriber's home demodulates the signal to recover the multiplexed digital streams, extracts the program of interest, and decodes the compressed audio and video contents for presentation on a display device.

There are a variety of methods for encoding and delivering these digital television programs. To promote the development of interoperable components from different manufacturers, the Moving Picture Experts Group ("MPEG") has developed several different international standards. The MPEG-2 standard is one of these standards particularly applicable for delivering digital television programs. According to the MPEG-2 standard, a transport stream typically consists of multiple packetized elementary streams ("PES") containing compressed audio and video data that are multiplexed with program-specific information ("PSI") that defines the content of the transport stream. The program-specific information usually includes a number of program information tables that provide a mapping between each type of data contained in the transport stream packets and a corresponding packet identifier ("PID") that labels all packets conveying the associated type of data. The program information tables therefore allow the receiver device to identify which transport stream packets contain audio and video data, as well as other types of data that may be conveyed in the transport stream packets.

In a conventional receiver device, an initial recovery of the program information tables is thus usually required. Based on the program information tables, the receiver device can then filter the correct transport stream packets to restore the audio and video contents of a program of interest. However, it is possible that sometimes the program information tables cannot be found or are not correctly recovered. In these situations, the conventional receiver device is usually incapable to further process the transport stream packets to restore the audio and video content.

What is needed in the art is thus a method and system that addresses at least the problems set forth above and allows a receiver device to still operate correctly to restore audio and video contents in the event of failing to recover program information tables from received transport stream packets.

SUMMARY OF THE INVENTION

The present application describes a method and system for generating a packet identifier table from a received transport stream. Specifically, one embodiment of the present invention sets forth a method of generating a packet identifier table, which includes the steps of reading a packet identifier value from a received transport stream packet, identifying a type of data contained in the received transport stream packet, and generating a table with mapping information between the packet identifier value and the identified type of data.

In another embodiment, a receiver device is disclosed. The receiver device comprises a processor, a memory, and a demultiplexer configured to process a received transport stream in an attempt to retrieve information descriptive of a structure of the transport stream, wherein in response to a failed attempt to retrieve the information, the processor is configured to trigger a scanning mode of operation in which the demultiplexer is configured to read a packet identifier value from a received transport stream packet and identify a type of data contained in the received transport stream packet, and the processor is configured to generate a table that associates the packet identifier value with the identified type of data.

At least one advantage of the present invention disclosed herein is the ability for the receiver device to generate a packet identifier table that can substitute for the use of certain program information tables conventionally retrieved from the received transport stream. In a situation where no program information table is successfully retrieved from the received transport stream, the receiver device is still provided with basic information descriptive of the content of the transport stream, and hence may still be able to operate to restore source program contents.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the drawings. It is to be noted, however, that the drawings illustrate only typical embodiments of this invention and are therefore not to be considered limiting of its scope, for the invention may admit to other equally effective embodiments.

DETAILED DESCRIPTION

The present application describes a method and system for generating a packet identifier table from a received transport stream. If the recovery of certain program information tables from the transport stream fails, one implementation of a receiver device enters a packet identifier ("PID") scan mode of operation, in which each received transport stream is systematically scanned so that a packet identifier table that includes mapping information between each identified type of data to a packet identifier value can be generated. With the packet identifier table that includes the basic information descriptive of the content of the transport stream, the receiver device can then appropriately interpret the transport stream packets.

Figure 1:
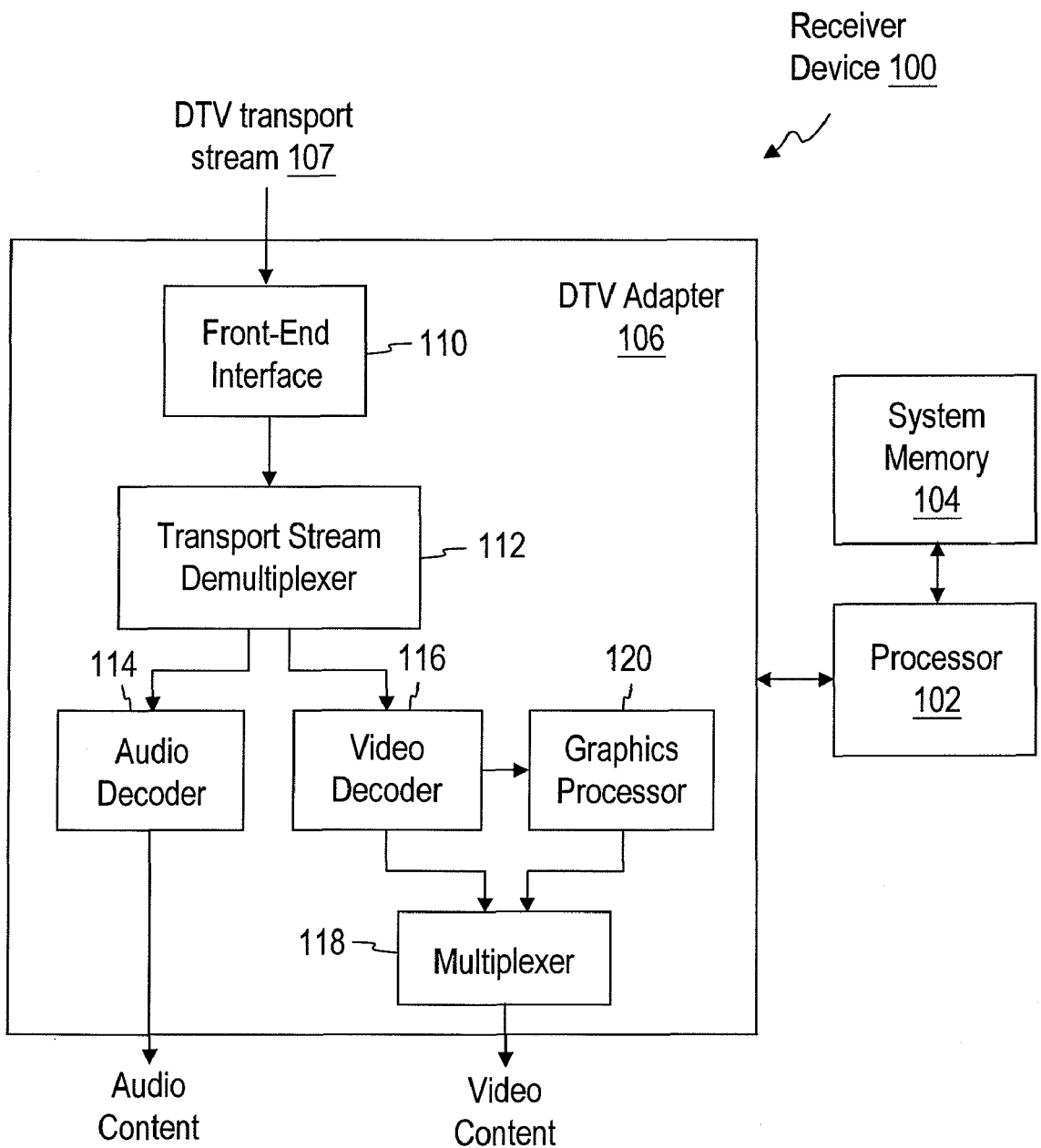
FIG. 1 is a block diagram of a receiver device adapted to process DTV content according to an embodiment of the present invention.

FIG. 1 is a block diagram of a receiver device 100 adapted to process DTV content according to an embodiment of the present invention. The receiver device 100 may be implemented in a set-top box, a standalone television set, a desktop computer, a laptop computer, a game console, a cellular telephone, a hand-held device, or the like. In one embodiment, the receiver device 100 comprises a processor 102 that is coupled to a system memory 104 and a DTV adapter 106. The processor 102 is configured to process information and to perform various functions of the DTV adapter 106. For example, the processor 102 may be a digital signal processor, a microcontroller, or a central processing unit ("CPU"). The system memory 104 is adapted to store digital information, including system codes, data and programs, such as an operating system for the DTV adapter 106, and the like. The system memory 104 can be implemented with random access memory (RAM), dynamic random access memory (DRAM), static random access memory (SRAM), or any combination thereof.

The DTV adapter 106 is configured to receive a DTV transport stream 107 and to process the DTV transport stream 107 to recover audio and video content for presentation on a display device (not shown in FIG. 1). In one implementation, the DTV transport stream 107 may contain transport stream ("TS") packets in compliance with the MPEG-2 standard. One implementation of the DTV adapter 106 comprises a front-end interface 110, a transport stream demultiplexer 112, an audio decoder 114, a video decoder 116, and a multiplexer 118. The front-end interface 110 is configured to demodulate signals of the DTV transport stream 107. Some examples of the front-end interface 110 include, without limitation, a satellite demodulator, a cable demodulator, or a terrestrial broadcast demodulator. The demodulated transport stream is then processed through the transport stream demultiplexer 112, which is configured to synchronize and filter the DTV transport stream 107 to differentiate among the elementary streams of audio data packets, video data packets, and program-specific information packets. The stream of audio data packets is processed through the audio decoder 114 to restore the audio content for output on an adapted output device (not shown in FIG. 1). The stream of video data packets are processed through the video decoder 116 to restore the video content that is then outputted through the multiplexer 118 for presentation on the display device. Alternatively, the video content restored by the video decoder 116 may also be processed through an optional graphics processor 120 before sending to the multiplexer 118 to prepare for presentation on the display device.

Figure 2:
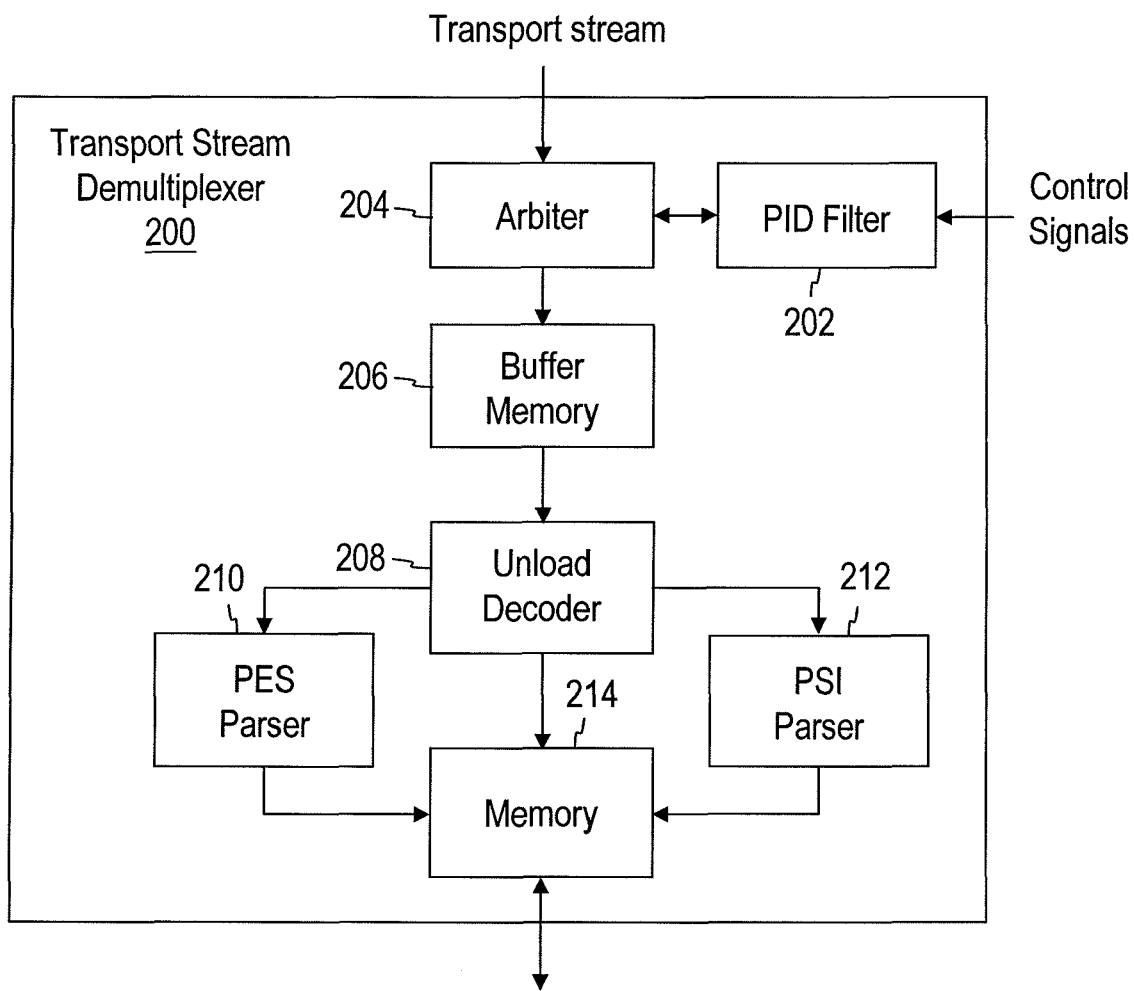
FIG. 2 is a block diagram of a transport stream demultiplexer according to one embodiment of the present invention.

FIG. 2 is a block diagram of a transport stream demultiplexer 200 according to one embodiment of the present invention. The transport stream demultiplexer 200 comprises a PID filter 202, an arbiter 204, a buffer memory 206, an unload decoder 208, a packetized elementary stream ("PES") parser 210, a program-specific information ("PSI") parser 212, and a memory 214. The PID filter 202 supports different modes of operations and is configured to switch to a particular operational mode based on the control signals received from a controller device, such as the processor 102 as shown in FIG. 1.

In one implementation, the PID filter 202 is adapted to operate in a PID scan mode, in which the PID filter 202 controls the arbiter 204 to read a PID value from each received transport stream packet and to store selected transport stream packets in the buffer memory 206. More particularly, for each accessed transport stream packet, the arbiter 204 is configured to either store the transport stream packet in the buffer memory 206 and accordingly report to the PID filter 202 if the read PID value is not identified in the previously stored transport stream packets or discard the transport stream packet if the read PID value is identified in the previously stored transport stream packets.

In one implementation, the buffer memory 206 may be a First-In-First-Out ("FIFO") buffer. In the PID scan mode of operation, the buffer memory 206 stores samples of transport stream packets that are representative of the different types of data contained in the transport stream.

The unload decoder 208 is configured to retrieve transport stream packets from the buffer memory 206 and to decode each transport stream packet to determine whether it contains a packetized elementary stream of compressed video or audio data or program-specific information. The PES parser 210 is configured to process a PES packet received from the unload decoder 208 and store associated packet information in the memory 214, including the packet content and the PID value associated with the packet. In the same manner, the PSI parser 212 is configured to process a PSI packet received from the unload decoder 208 and store associated packet information in the memory 214, including also the packet content and the PID value associated with the packet. Based on the packet information stored in the memory 214, a packet identifier table can be constructed by mapping each PID value to one identified type of data. Such basic information descriptive of the content of the received transport stream can then be utilized to subsequently filter transport stream packets.

Figure 3:
FIG. 3 is a chart illustrating an example of a packet identifier table generated in a PID scan mode of operation according to an embodiment of the present invention.

FIG. 3 is a diagram illustrating an example of a packet identifier table 302 generated in a PID scan mode of operation according to an embodiment of the present invention. The packet identifier table 302 contains a PID Value field and a Data Type field. It should be noted that all transport stream packets containing a same type of data also have a same PID value. Each PID value in the PID Value field in the packet identifier table 302 corresponds to one type of data in the Data Type field. The types of data contained in a transport stream packet may include, without limitation, audio data, video data, and program-specific information that is descriptive of the structure of the received transport stream. Based on the packet identifier table 302, a packet containing a specific type of data can therefore be easily filtered from the received transport stream by identifying the corresponding PID value stored in the packet identifier table 302.

Figure 4:
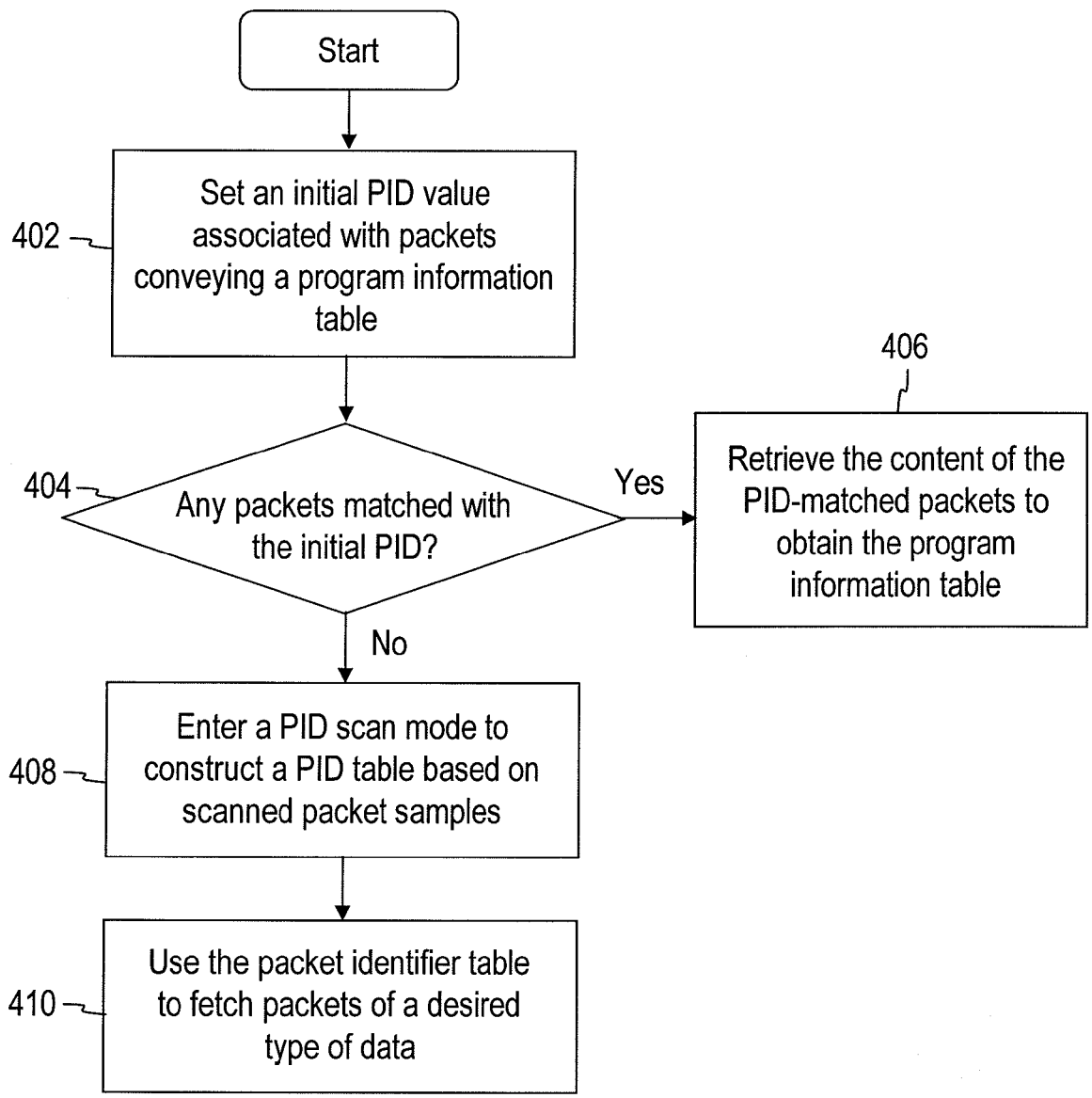
FIG. 4 is a flowchart of method steps performed to retrieve information descriptive of the structure of a received transport stream according to one embodiment of the present invention.

In conjunction with FIGS. 1 and 2, FIG. 4 is a flowchart of method steps performed to retrieve information descriptive of the content of a received transport stream, according to one embodiment of the present invention. In initial step 402, the PID filter 202 sets an initial PID value in the arbiter 204 to search for packets containing information descriptive of the content of the received transport stream. In one implementation, the searched information may include a program information table, such as the Program Association Table ("PAT") defined by the MPEG-2 standard. In step 404, the arbiter 204 then reads the PID value of each received transport stream packet and determines whether the read PID value matches with the initial PID value. If the arbiter 204 finds the PID-matched packets within a preset period of time, the found packets are decoded in step 406 to retrieve the program information table. On the other hand, if the PID-matched packets are not found within the given period of time, the transport stream demultiplexer 200 of FIG. 2 in step 408 enters into a PID scan mode of operation to construct a packet identifier table based on the samples of the received transport stream packets. In step 410, the constructed packet identifier table can then be used to fetch packets of a desired type of data. Even if no PAT was successfully retrieved from the received transport stream, transport stream packets then can still be filtered from the received transport stream by using the packet identifier table. For example, suppose that the packet identifier table 302 of FIG. 3 has been generated in step 408. The processor 102 of FIG. 1 in step 410 may then request the transport stream demultiplexer 200 to filter all the transport stream packets labeled with the packet identifier value "0x17" or "0x2E", which may contain other useful program-specific information for restoring video and audio contents for one specific program, such as the Program Map Table ("PMT") defined in the MPEG-2 standard. As a result, the receiver device may still be able to filter the transport stream packets to restore source program contents.

Figure 5:
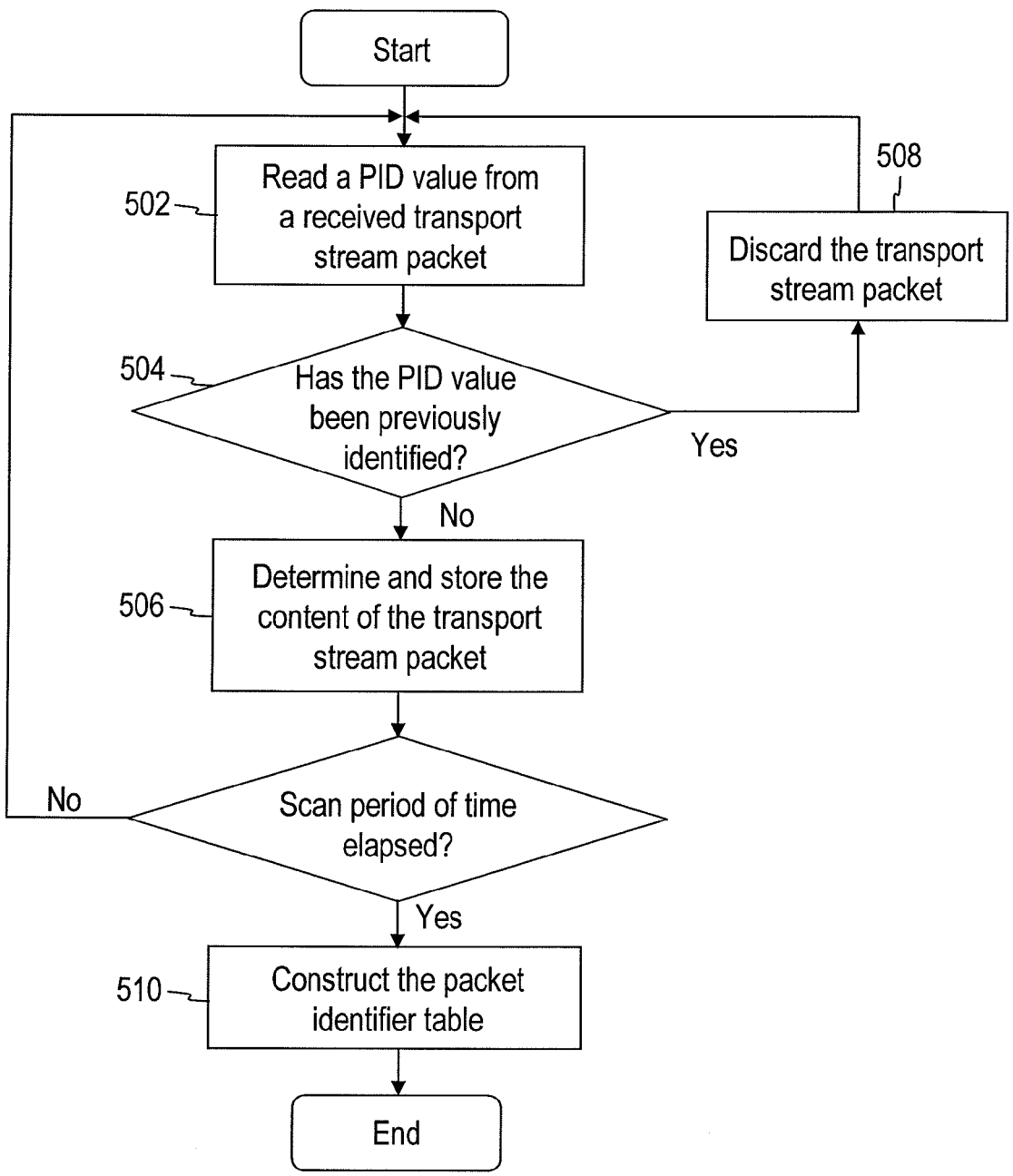
FIG. 5 is a flowchart of method steps performed in a PID scan mode of operation to generate a packet identifier table according to an embodiment of the present invention.

FIG. 5 is a flowchart of method steps performed in a PID scan mode of operation according to an embodiment of the present invention. In one embodiment, the PID scan mode of operation is performed over a predetermined period of time that is sufficient to ensure that all the PID values have been identified from the received transport stream packets. For each received transport stream packet, the arbiter 204 of FIG. 2 in initial step 502 reads a PID value from the transport stream packet. In step 504, the arbiter 204 then determines whether the same PID value has been identified in any transport stream packet previously received in the scan mode of operation. If the read PID value has not has been previously identified, the arbiter 504 informs the PID filter 202 accordingly, and step 506 is performed to transfer the transport stream packet into the buffer memory 206 and then to decode and store the decoded content of the transport stream packet in the memory 214. On the other hand, if the arbiter 204 in step 504 determines that a same PID value has been identified in a previous transport stream packet, the arbiter 204 in step 508 discards the transport stream packet. The steps 502-508 are repeated to accumulate packet information in the memory 214, until the scan period of time has elapsed. Once the scan period of time elapses, the memory 214 includes information relevant to each scanned packet, such as the PID value and the content of each scanned packet. In step 510, the processor 102 can then access the packet information stored in the memory 214 to generate a packet identifier table. The packet identifier table may then be used to filter subsequently received transport stream packets for restoring source program contents.

At least one advantage of the present invention disclosed herein is therefore the ability for the receiver device to generate a packet identifier table that can substitute for the use of certain program information tables contained in a received transport stream. As a result, even if the recovery of such program information tables from the received transport stream fails, the receiver device is provided with the basic information descriptive of the content of the transport stream and hence may still be able to operate to restore source program contents.

The above description illustrates various embodiments of the present invention along with examples of how aspects of the present invention may be implemented. The above examples, embodiments, instruction semantics, and drawings should not be deemed to be the only embodiments, and are presented to illustrate the flexibility and advantages of the present invention as defined by the following claims.

We claim:

1. A method of constructing a packet identifier table, comprising:

in response to a failed attempt to retrieve information descriptive of a structure of a transport stream from the transport steam received by a receiver device within a predetermined period of time, wherein the information descriptive of the structure of the transport stream contains a program information table, reading, by the receiver device, a packet identifier value from a received transport stream packet;

identifying, by the receiver device, a type of data contained in the received transport stream packet; and generating, by the receiver device, the packet identifier table with mapping information between the packet identifier value and the identified type of data, as a substitute for the information descriptive of the structure of the transport stream to filter the transport stream.

2. The method of claim 1, wherein the type of data includes video data, audio data, or program-specific information, and the program information table is a Program Association Table (PAT).

3. The method of claim 1, further comprising determining whether the packet identifier value has been identified in any previously received transport stream packets before performing the step of identifying the type of data contained in the received transport stream packet.

4. The method of claim 3, wherein the step of identifying a type of data contained in the received transport stream packet is performed if the packet identifier value has not been identified in any previously received transport stream packets.

5. The method of claim 3, further comprising discarding the received transport stream packet if the packet identifier value has been identified in a previously received transport stream packet.

6. The method of claim 1, wherein each received transport stream packet having a same type of data has a same packet identifier value.

7. The method of claim 1, wherein the received transport stream packet is formatted according to the MPEG-2 standard.

8. The method of claim 1, wherein the step of identifying a type of data contained in the received transport stream packet further comprises decoding the received transport stream packet.

9. A method for processing a transport stream received at a receiver device; comprising:

attempting, by the receiver device, to retrieve information descriptive of a structure of the transport stream from received transport stream packets, wherein the information descriptive of the structure of the transport stream contains a program information table; and in response to a failed attempt to retrieve the information within a predetermined period of time, switching, by the receiver device, to a packet identifier scanning mode of operation, further comprising:

reading a packet identifier value from a received transport stream packet;

identifying a type of data contained in the received transport stream packet; and generating a packet identifier table with mapping information between the packet identifier value and the identified type of data, as a substitute for the information descriptive of the structure of the transport stream to filter the transport stream.

10. The method of claim 9, wherein the type of data includes video data, audio data, or program-specific information, and the program information table is a Program Association Table (PAT).

11. The method of claim 9, further comprising determining whether the packet identifier value has been identified in any transport stream packets previously received during the scanning mode of operation before performing the step of identifying the type of data contained in the received transport stream packet.

12. The method of claim 11, wherein the step of identifying a type of data contained in the received transport stream packet is performed if the packet identifier value has not been identified in any previously received transport stream packets.

13. The method of claim 11, further comprising discarding the received transport stream packet if the packet identifier value has been identified in a previously received transport stream packet.

14. The method of claim 9, wherein the received transport stream packet is formatted according to the MPEG-2 standard.

15. A receiver device, comprising:
a processor;
a memory system; and
a demultiplexer configured to process a received transport stream in an attempt to retrieve information descriptive of a structure of the received transport stream, the information descriptive of the structure of the received transport stream contains a program information table;
wherein in response to a failed attempt to retrieve the information within a predetermined period of time, the processor is configured to trigger a scanning mode of operation in which
the demultiplexer is configured to
read a packet identifier value from a received transport stream packet;
identify a type of data contained in the received transport stream packet; and
the processor is configured to generate a packet identifier table that associates the packet identifier value with the identified type of data as a substitute for the structure of the received transport stream to filter the received transport stream.

16. The receiver device of claim 15, wherein the type of data includes video data, audio data, or program-specific information, and the program information table is a Program Association Table (PAT).

17. The receiver device of claim 15, wherein the demultiplexer is further configured to determine whether the packet identifier value has been identified in any transport stream packets previously received during the scanning mode of operation before the demultiplexer is configured to identify the type of data contained in the received transport stream packet.

18. The receiver device of claim 17, wherein the demultiplexer is configured to identify a type of data contained in the received transport stream packet if the packet identifier value has not been identified in any previously received transport stream packets.

19. The receiver device of claim 17, wherein the demultiplexer is further configured to discard the received transport stream packet if the packet identifier value has been identified in a previously received transport stream packet.

20. The receiver device of claim 15, wherein the received transport stream packet is formatted according to the MPEG-2 standard.

* * * * *